Figure 1:
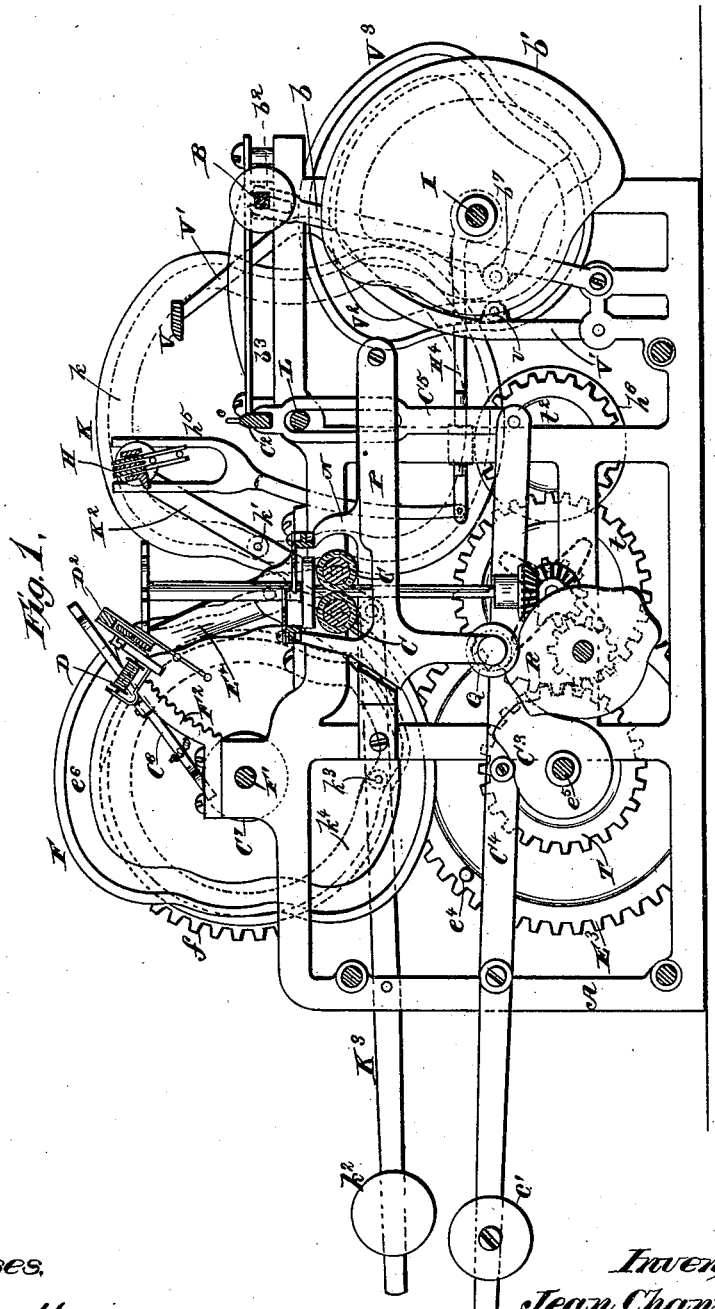

(No Model.) 8 Sheets—Sheet 1.

J. CHAUNIER.
MACHINE FOR MAKING FISH NETS.

No. 256,287. Patented Apr. 11, 1882.

Witnesses,
Robert Everett
Jo. S. Coombs

Inventor:
Jean Chaunier.
By James L. Norris.
Atty.

(No Model.) 8 Sheets—Sheet 2.
J. CHAUNIER.
MACHINE FOR MAKING FISH NETS.

No. 256,287. Patented Apr. 11, 1882.

Witnesses:
Robert Everett
Jos. L. Coombs

Inventor:
Jean Chaunier
By James L. Norris
Atty.

(No Model.) 8 Sheets—Sheet 3.
J. CHAUNIER.
MACHINE FOR MAKING FISH NETS.
No. 256,287. Patented Apr. 11, 1882.
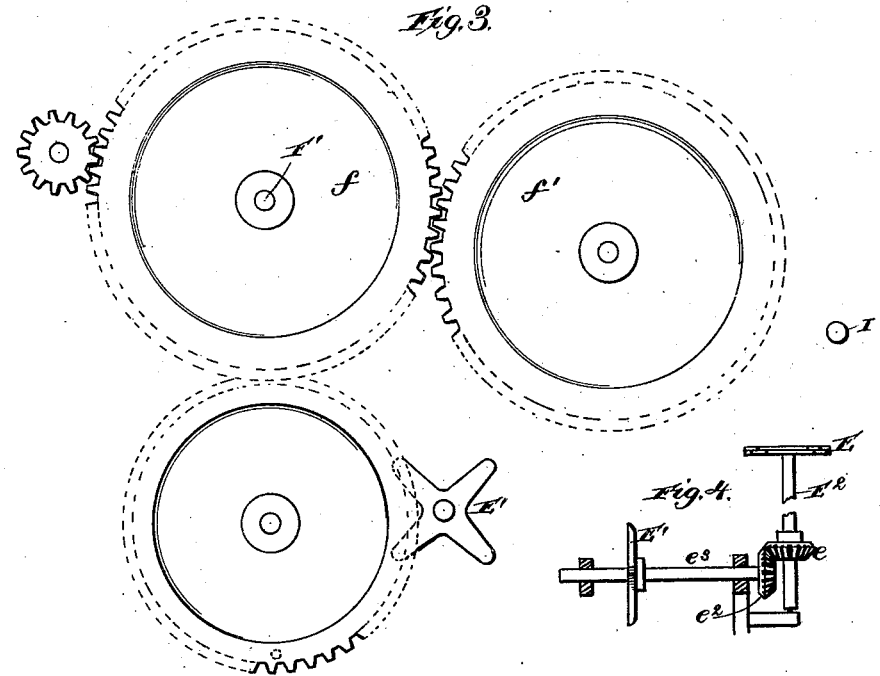
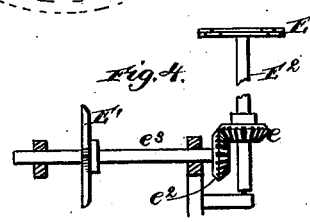
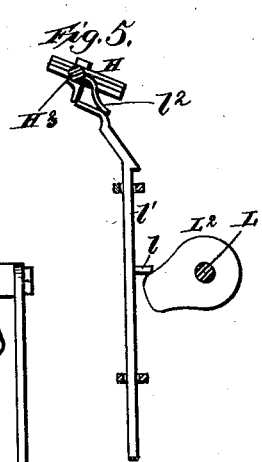
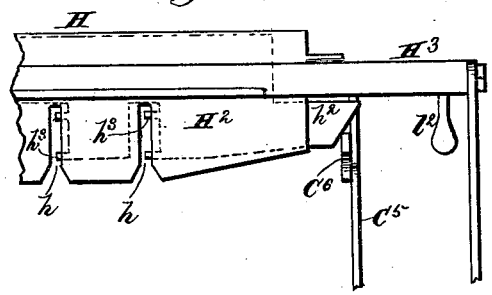
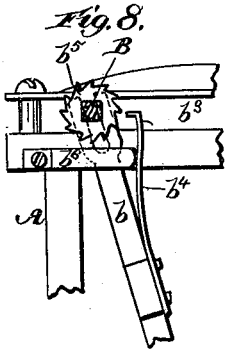
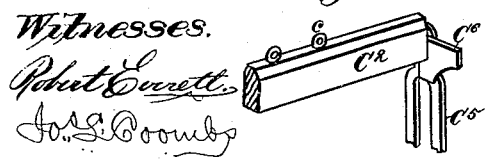
Witnesses.
Robert Everett
Jos. L. Coombs
Inventor:
Jean Chaunier
By James L. Norris
Atty.

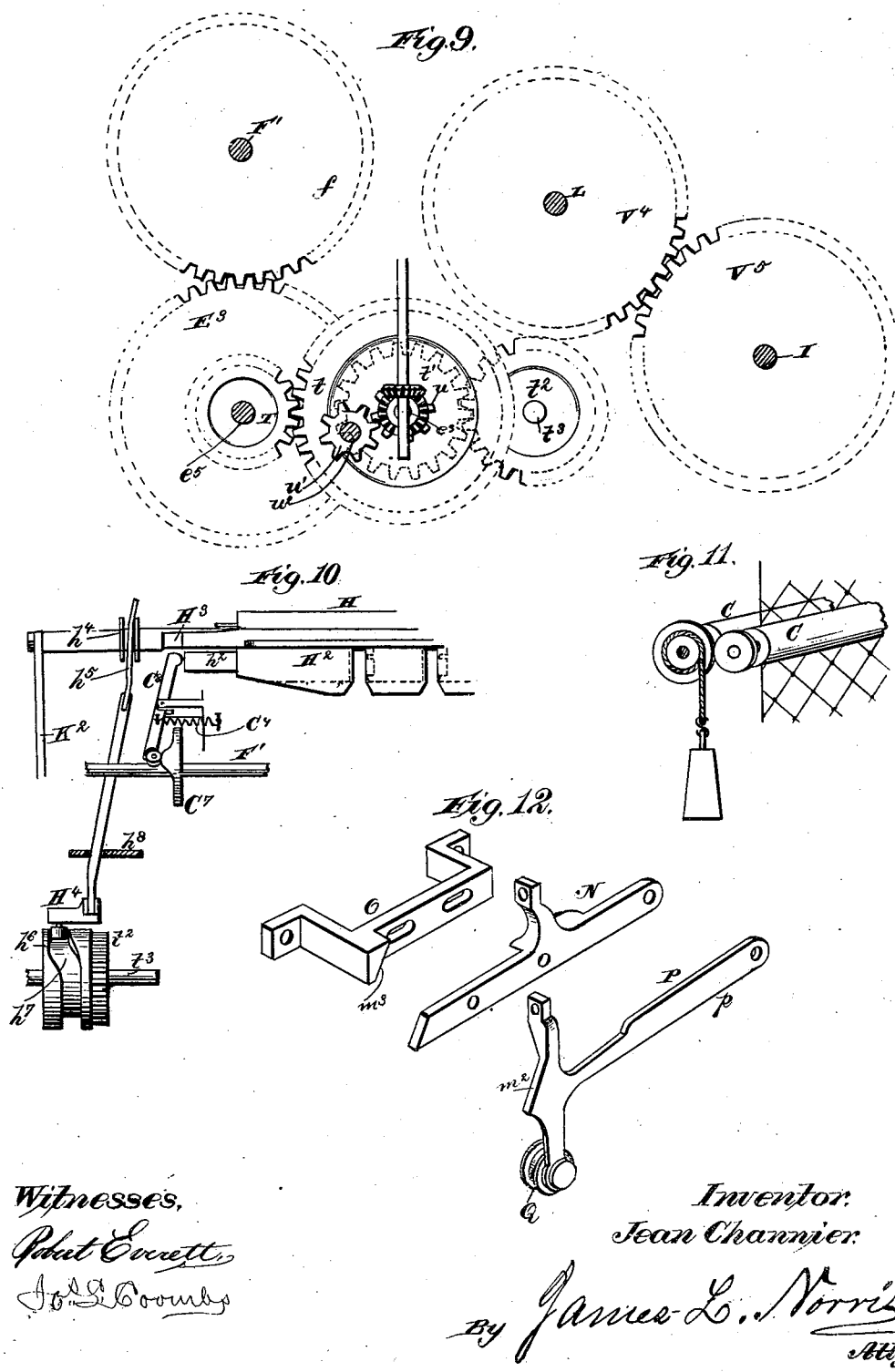

(No Model.) 8 Sheets—Sheet 5.
J. CHAUNIER.
MACHINE FOR MAKING FISH NETS.
No. 256,287. Patented Apr. 11, 1882.
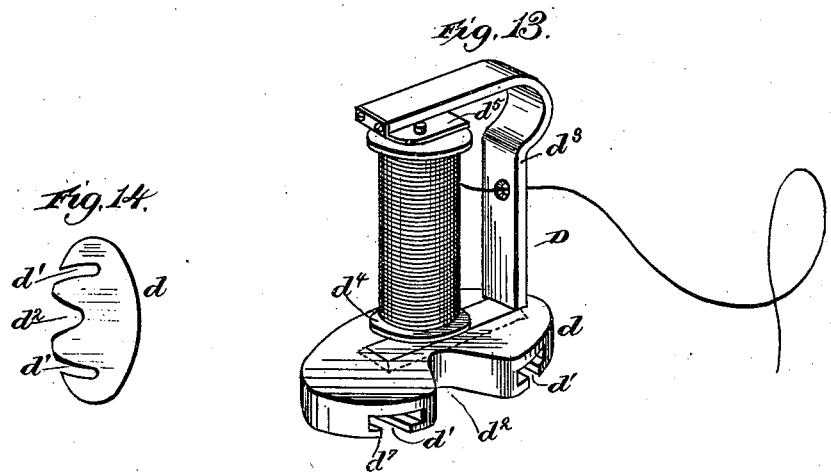
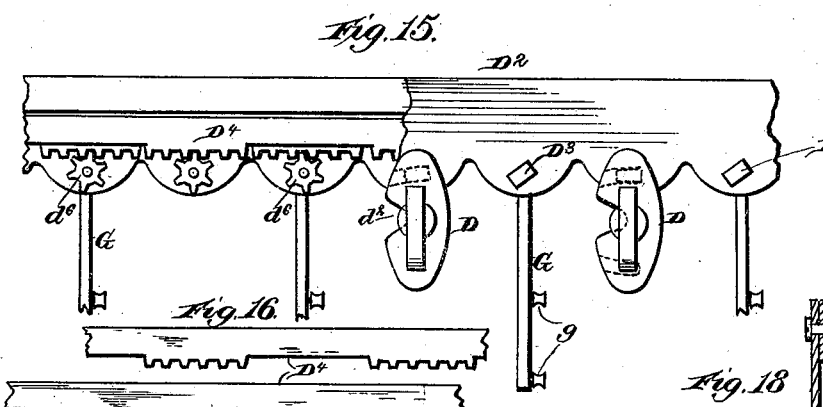
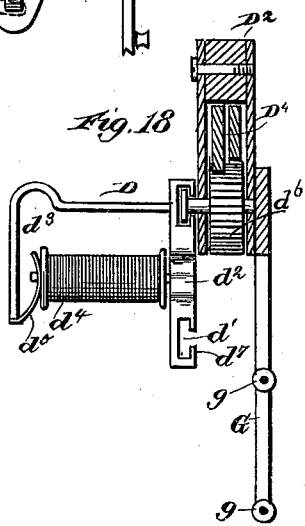
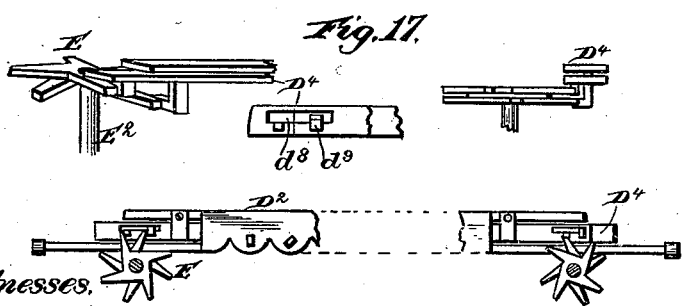
Witnesses,
Robert Everett
Jo. L. Coombs
Inventor:
Jean Chaunier,
By James L. Norris,
Atty.

(No Model.) 8 Sheets—Sheet 6.
J. CHAUNIER.
MACHINE FOR MAKING FISH NETS.
No. 256,287. Patented Apr. 11, 1882.
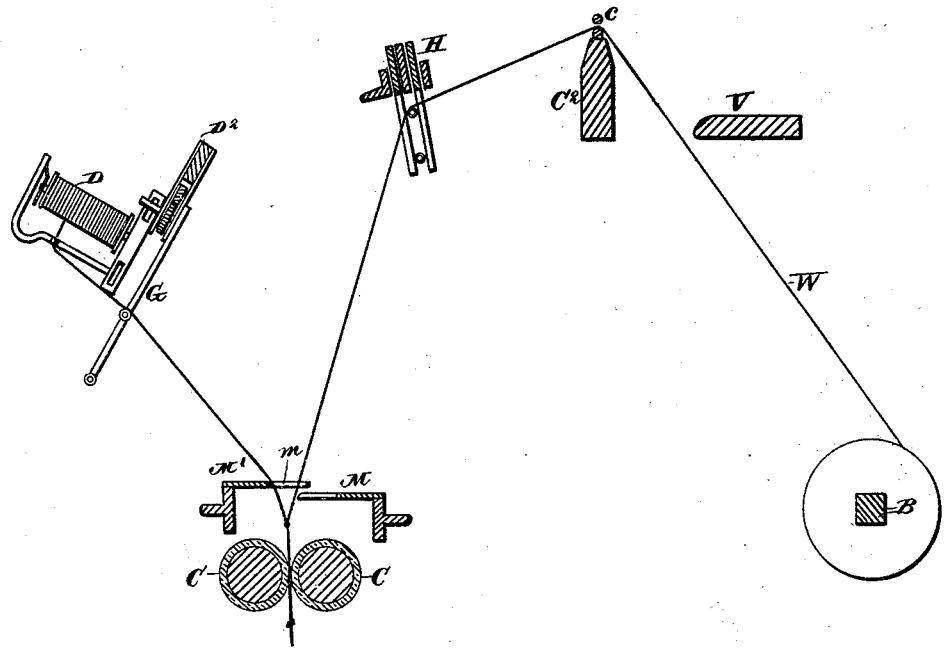
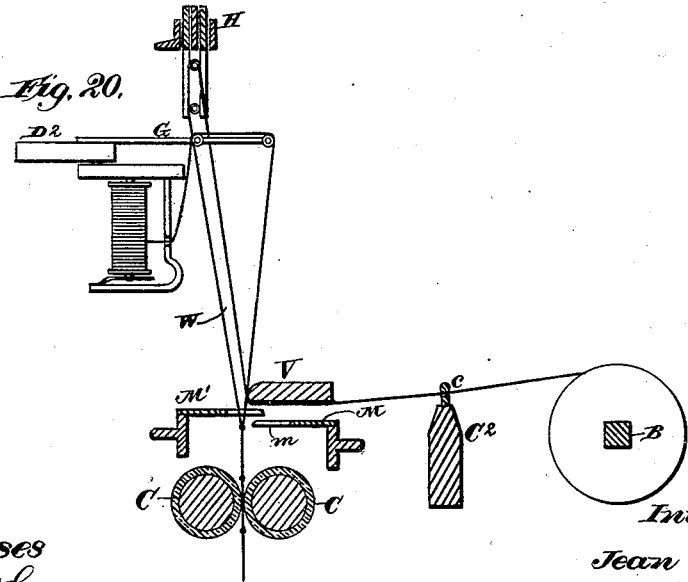
Witnesses
Robert Everett
Jos. L. Coombs
Inventor.
Jean Chaunier,
By James L. Norris,
Atty.

(No Model.) 8 Sheets—Sheet 7.
J. CHAUNIER.
MACHINE FOR MAKING FISH NETS.
No. 256,287. Patented Apr. 11, 1882.
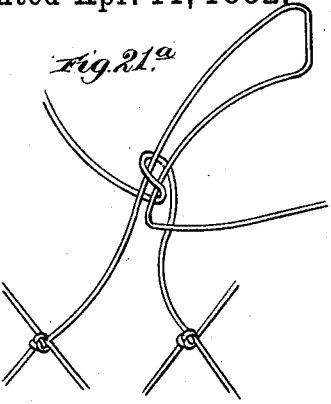
Fig. 21.ᵃ
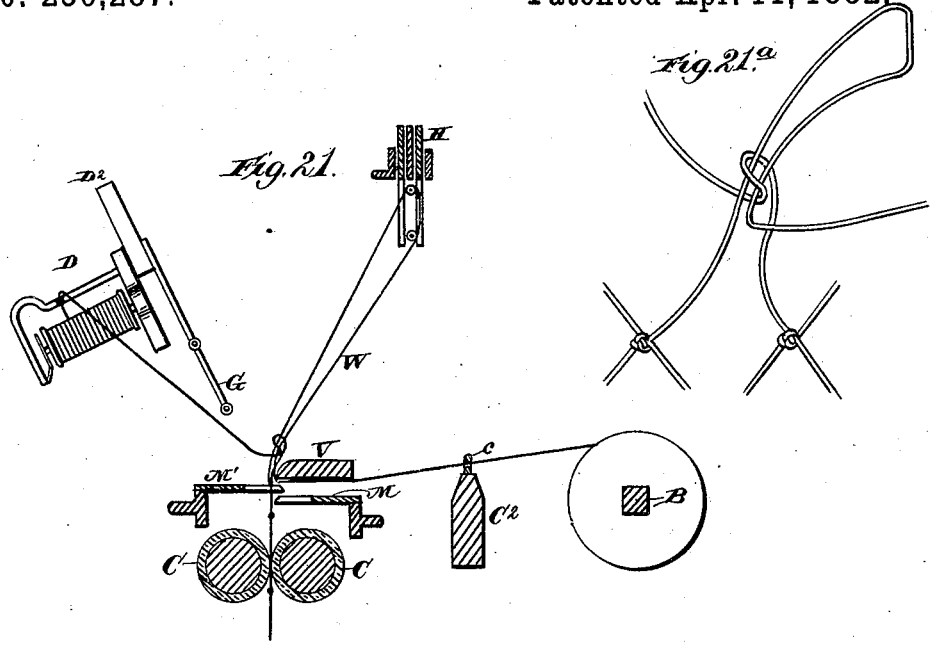
Fig. 21.
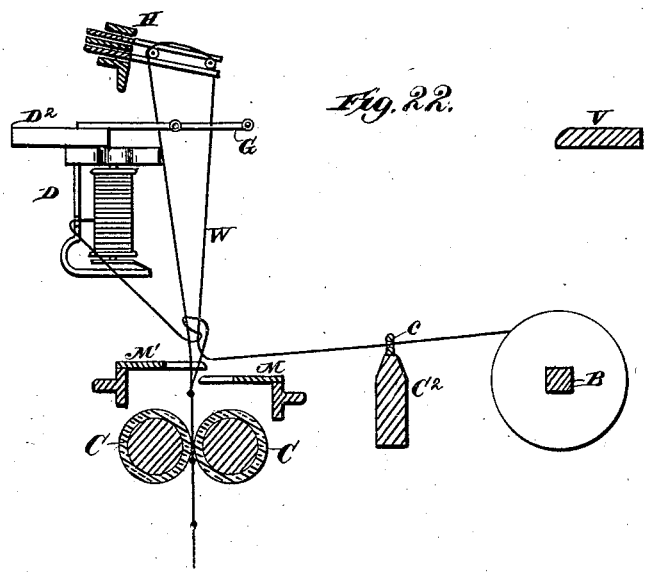
Fig. 22.
Witnesses,
Robert Everett
Jos. L. Coombs
Inventor:
Jean Chaunier
By James L. Norris
Atty.

(No Model.)
J. CHAUNIER.
MACHINE FOR MAKING FISH NETS.
No. 256,287. Patented Apr. 11, 1882.
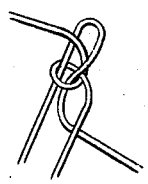
Fig. 23.ᵃ
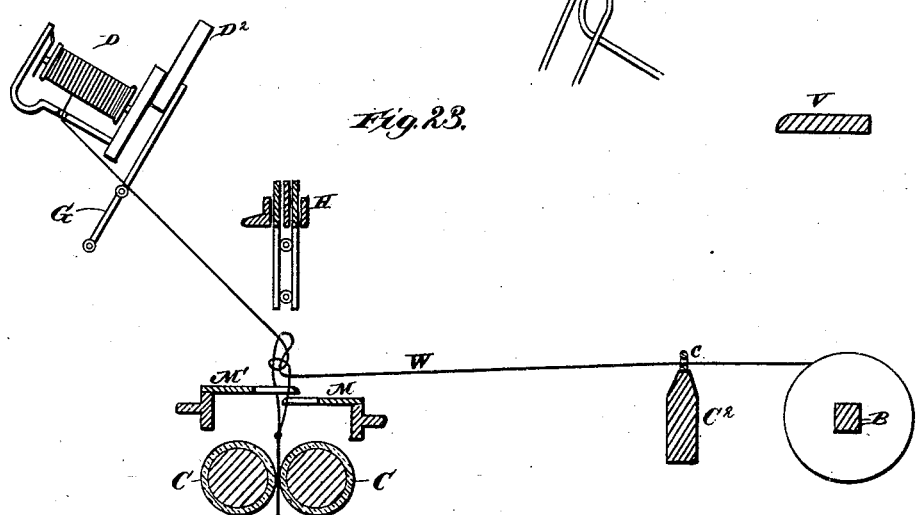
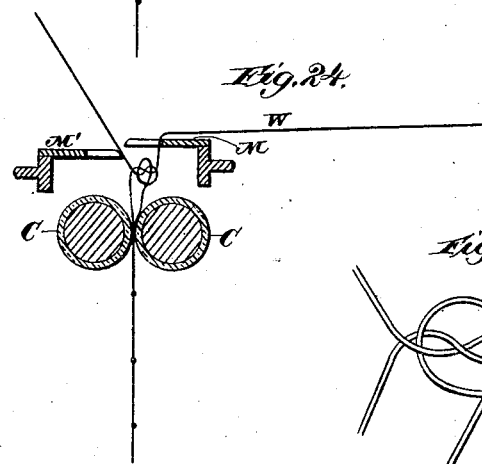
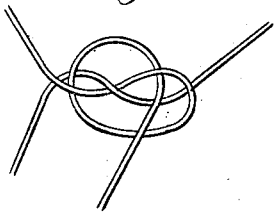
Fig. 25.
Witnesses.
Robert Everett
Jo. L. Coombs
Inventor:
Jean Chaunier.
By James L. Norris.
Atty

UNITED STATES PATENT OFFICE.

JEAN CHAUNIER, OF LYONS, FRANCE, ASSIGNOR, BY DIRECT AND MESNE ASSIGNMENTS, TO PIERRE J. BORIS, OF BOSTON, FRANK G. KINCAID, OF SOMERVILLE, AND OSCEOLA A. WHITMORE, OF MALDEN, MASS.

MACHINE FOR MAKING FISH-NETS.

SPECIFICATION forming part of Letters Patent No. 256,287, dated April 11, 1882.

Application filed September 29, 1881. (No model.) Patented in France October 30, 1880.

*To all whom it may concern:*

Be it known that I, JEAN CHAUNIER, of Lyons, France, have invented a Machine for Making Fishing-Nets, of which the following is a specification.

This invention relates to machines for making netting for seines and other purposes of the description known as the "diagonal mesh."

The primary object of the improvement is to provide devices for automatically tying the threads or cords into knots known as the "fisherman's" or "double-becket" knot, and similar to those employed in the construction of hand-made nets.

A further object of the improvement is to provide improved mechanism for producing a net similar to that made by hand in a rapid and effective manner, and to so construct and arrange the knot-tying devices that the knots will be tied with great rapidity and in a manner which will prevent their slipping.

These objects are attained by means of the devices illustrated in the accompanying drawings, in which—

Figure 2:
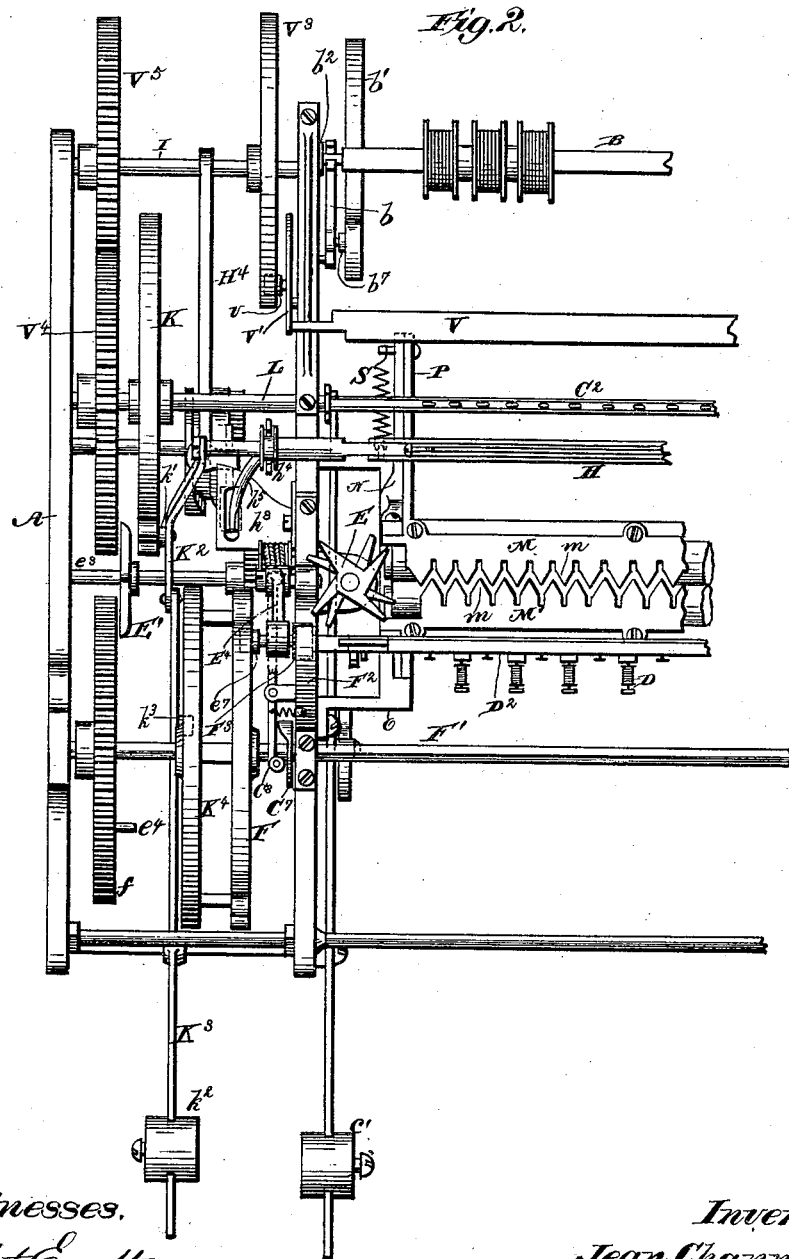

Figure 1 represents a transverse section taken on a vertical central plane through the machine. Fig. 2 is a top or plan view of one end of the machine, both ends of the machine being constructed alike, with the exception of a few details, which will readily be understood from the description of the operative parts of the mechanism. Fig. 3 illustrates the train of gearing at that end of the machine where the power is applied. Fig. 4 is a detail view of devices employed for actuating the mechanism that serves to operate the "brocheurs" or knot-tying devices. Fig. 5 is a detail representing devices employed for tilting the thread-holder so as to spread the loop in forming the second part of the knot. Fig. 6 represents an end portion of the thread-holder for the warp. Fig. 7 represents an end portion of the thread guides and lifter for the warp, a portion of the same being also illustrated in Fig. 6. Fig. 8 is a detail view, illustrating the devices for preventing the roller carrying the spools or reels upon which the warp-threads are wound from turning during the operation of tying the knot. Fig. 9 shows the train of gearing at the end of the machine opposite to that shown in Fig. 3, viewed from the inside of the machine. Fig. 10 shows the end of the thread-holder opposite to that shown in Fig. 6, this figure also showing the mechanism for shifting one section of the thread-holder so as to engage or release the warp-threads, and also shows the devices for shifting the entire thread-holder so as to move the warp-threads laterally in order to form the diagonal mesh. Fig. 11 illustrates an end portion of each of a pair of rollers between which the finished net is drawn. Fig. 12 is a detail representing the arms or bars for supporting the mold-bars and a bracket which supports one of said arms or bars. Fig. 13 is a perspective view of one of the brocheurs or knot-tying devices. Fig. 14 is a plan view of the under side of the base of one of the brocheurs. Fig. 15 represents a portion of the frame that carries the brocheurs, with a part of said frame broken away in order to show the mutilated rack-bars and pinions for actuating the brocheurs. Fig. 16 represents a portion of each mutilated rack-bar. Fig. 17 is a detail view, representing in different positions the star-wheels employed for actuating the mutilated rack-bars, and also portions of the said rack-bars. Fig. 18 is a transverse section taken through the frame carrying the brocheurs, and also shows a side view of one of the brocheurs. Fig. 19 is in the nature of a diagram, illustrating the first position of the threads and the main operative parts of the knot-tying devices preparatory to forming the first portion of the knot; Fig. 20, a like view, illustrating the second position in which a loop is formed by the warp-thread and the weft-thread brought into position by one of the fingers on the brocheur-frame. Fig. 21 is a like view, illustrating the third position of said parts after the first portion or first half hitch of the knot has been formed. Fig. 21[a] illustrates on an enlarged scale the knot as formed at this stage of the operation. Fig. 22 shows the fourth position of parts, in which the loop formed by the warp-thread is open preparatory to the passage through it of the brocheur carrying the weft-thread. Fig. 23 shows the fifth position after the weft-thread has been passed through the loop shown in Fig. 22 and the warp has been released from the thread-holder. Fig. 23ª shows on an enlarged scale the knot at this stage of the operation. Fig. 24 shows the knot in its finished form after it has been slipped off a finger of one of the mold-bars. Fig. 25 shows the completed knot with the threads spread apart so as to illustrate the formation of the same.

The letter A indicates the frame of the machine, which is suitably constructed for supporting and affording bearings for the operative parts of the mechanism.

The feed-roller bar B carries the spools for the threads, which I will arbitrarily designate as the "warp-threads" in contradistinction to the other set of threads that are employed in forming the net, and which, as will appear farther on, are designated as the "weft-threads." This feed roller bar B is mounted upon a pair of vibratory arms, $b$, which are swung forward at the proper moment for furnishing slack for forming the mesh and the knots to be tied, and which are swung back when it becomes necessary to tighten up the knots that have been formed. The mechanism for actuating these arms consists of a pair of wheels, $b'$, one on each side of the machine, formed with cam grooves or races that receive anti-friction rollers carried by the vibratory arms, as seen at $b^7$, Figs. 1 and 2. The feed-roller bar B is guided and steadied in its forward and backward movements by means of blocks $b^2$, that slide in the ways $b^3$ and receive the ends of the feed-roller-bar journals. The feed-roller bar B is prevented from unwinding its threads while the knots are being tied by means of a spring-pawl, $b^4$, Fig. 8, carried by one of the vibratory arms and located to engage a ratchet-wheel, $b^5$, upon the roller.

To permit the free rotation of the bar carrying the reels or spools at the proper moment, an arm, $b^6$, is fixed upon the main frame in position to push the spring-pawl away from the ratchet-wheel when the roller is moved back to about the end of its travel in such direction.

C C are the elastic-faced rolls, between which the net is received and taken up as finished. Upon the end of one of these rollers is fixed a grooved pulley, upon which is wound a cord suspending a weight, as shown in Fig. 11. By this means, as soon as a line of knots and meshes have been finished above these rolls and the net allowed to drop to a certain extent, the rolls will be turned in reverse direction, and hence the finished portion of the net be drawn between them. Between these rolls and the feed-roller bar B is arranged the thread guide and lifter $C^2$, which consists of a horizontal bar having a series of eyes or guide-rings, $c$, through which pass the warp threads, one for each mesh. This device not only guides the threads from the feed-roll, but also raises the threads preparatory to the tying of the knots, in order to bring the threads in position to be caught by a device designated as the "thread-holder," and described hereinafter. The vertical movements of this lifter-bar are attained by means of the cams $C^3$—one upon each side of the machine—acting upon pivoted levers $C^4$ $C^4$, which are each provided at one end with an adjustable counter-weight, $c'$, and which are connected with the lifter-bar at their remaining ends by the connecting-rods $C^5$. These connecting-rods are properly guided in their up and down movements, and the cams are so timed as to act upon the weighted levers just after the formation of one mesh and preparatory to the formation of another.

The reels from which the threads designated for convenience as the "weft-threads" are unwound are carried by the knot-tying devices designated as the "brocheurs," which term will when hereinafter employed include said reels. I have adopted the term "brocheur" for convenience in indicating a device embracing several parts, which, while having their individual functions, have also, when combined, a single function—namely, that of carrying the weft around the warp-threads to form a half-hitch, in the manner hereinafter described.

The brocheur D consists of an elliptical-shaped plate, $d$, having formed upon its under side a pair of channels, $d'$, opening at one edge of the plate. These channels converge slightly toward each other from their inner to their outer ends, and have their inner ends on or about on the axial line of the ellipse. The plate $d$ is formed between its ends with a notch, $d^2$, which catches the warp-threads during one of its movements in tying the knot, and to one of its sides is secured the reel-carrier $d^3$, from which the reel $d^4$ can be detached when empty and replaced by a fresh one. The reel-spindle has one of its bearings in a spring, $d^5$, which bears upon one end of the reel, so as to constitute a tension device. The brocheur-frame $D^2$, that carries these brocheurs D, is provided with a series of small pinions, $d^6$, having upon their axles the heads $D^3$, adapted to enter the channels in the brocheurs, and thus maintain the latter upon the frame.

It will be observed that each one of these channels is formed so as to leave lips or flanges $g^7$ along its lower edges. The head $D^3$ enters the channel above these lips, and hence the brocheur will be prevented from dropping off the frame. These small pinions are given a simultaneous and partial rotation by means of the mutilated rack-bars $D^4$, arranged to slide longitudinally through the brocheur-frame. Two spur-wheels are provided for each brocheur, so that there will be two centers for each brocheur to turn upon—that is to say, if the head of one spur-wheel spindle is received into one of the grooves in the brocheur, with the latter swung out at right angles to the frame, and upon an impulse being given to the spur-wheel the brocheur will be turned about the axis of said spindle until the other groove of the brocheur receives the head of the second spindle, at which moment the movement of the first spindle will cease by reason of the arrangement of the mutilated rack-bars, as presently fully described, and this second spindle will be turned about its axis by the action of the rack-bars upon its pinion, so that the brocheur will be caused to leave the head of the first spindle and be swung round the axis of the second. This movement on the part of the brocheur is effected for the purpose of passing the thread-carrier and its reel around and between the threads during the knot-tying operation. The engagement of these mutilated rack-bars with the pinions for causing a positive movement on the part of the brocheurs will be understood by reference to Figs. 15, 16, and 17. The two rack-bars are arranged relatively to each other as in Fig. 16, with the toothed portions of one opposite the plane or broken portions of the other, and on each end of the brocheur-frame is arranged a star-wheel, E, the spurs of which act at proper times upon lugs on the rack-bar. If, now, the brocheur is in position at right angles to the brocheur-frame, as shown in Fig. 15, the pinion over which it is supported will be engaged by one rack-bar, while the plain edge of the next or second rack-bar will be opposite said pinion. The first rack-bar being moved by the star-wheel E, the brocheur will be swung round and make a quarter-revolution, and will be caught upon the head of the next pinion-axle, the said head being received in one of the grooves of the base-plate of the brocheur. The star-wheel, which has an upper and lower set of spurs, which alternate with each other, as shown in Fig. 7, is, however, caused by its actuating devices to continue its rotation so as to bring a spur of the next one of its sets into action against the second rack-bar. The second rack-bar will then be struck by the star-wheel, and hence turn the second pinion, so as to give a partial rotation to its spindle, upon the head of which the brocheur has been caught, as above stated, whereby the brocheur will be caused to leave the first spindle, about which it has made a part revolution as a center, and to turn about the second spindle as a center, so as to complete its half-revolution. The devices are so timed that the movements of these rack-bars will bring and leave the heads on their axles in proper position for engaging the slots of the brocheurs, and also so as to hold the brocheurs in position at or about at right angles to the brocheur-frame after the brocheurs have been swung around so as to pass the weft-threads around and through the loops of the warp-threads, as hereinafter more fully explained.

$d^8$ is a slot in one of the mutilated rack-bars for the lug $d^9$ of the rack-bar that is under it to pass through. The rack-bars that actuate the spur-wheels are reciprocated at the moments when it becomes necessary to turn the brocheurs by means of two star-wheels, E, one of which is located below each end of the brocheur-frame in position to act upon the rack-bars. Each star-wheel is secured upon the upper end of a vertical rotary shaft, $E^2$, that carries near its lower end a bevel-gear, $e$, arranged to mesh with a bevel-gear, $e^2$, upon a short horizontal shaft, $e^3$. (See Fig. 4.) The means shown for imparting an intermittent motion to this shaft consist of a star-wheel, E', upon said shaft and a pin, $e^4$, upon a wheel, $E^3$, mounted upon the shaft $e^5$, that carries the cams $C^3$, which latter, as already stated, cause the thread-lifter to rise.

The brocheur-frame is journaled at its ends in the crank-arms $E^4$, that are pivoted to the main frame, and it has a limited swing, which is determined by the cam-race $e^6$, that receives anti-friction rollers $e^7$ (see Figs. 1 and 2) upon the ends of the journals of said frame. The wheels F, provided with cam-races $e^6$, are mounted, one at each side of the machine, upon a shaft, F', provided with gear-wheels $f$, that form a part of the train of gearing at each side of the machine. The brocheur-frame is also capable of an oscillating movement upon its axis, which is effected by means of the segmental rack-bars $F^2$, fixed to the main frame and located to engage gear-wheels $F^3$, (see Fig. 2,) that are rigid upon the journals at the ends of the brocheur-frame. The cam-races $e^6$, that thus cause the swing, and consequently the oscillation of the brocheur-frame, are so formed or timed that during the operation of tying a knot one revolution of the wheels provided with said cam-races will cause the brocheur-frame to have, first, a partial revolution upon its axis in arm $E^4$, next a short movement back, and next a movement forward or in the reverse direction, and then a reverse part revolution on its axis, which will bring the brocheur-frame to its first position. The result of these movements will be pointed out in describing the operation of tying the knot.

The brocheur-frame carries, in addition to the devices already specified, a series of laterally-projecting fingers, G, formed with a plate that is secured to the brocheur-frame on the side opposite to that on which the brocheurs are located. Each finger has two grooved rollers or hooks, $g\ g$, one at the end and the other somewhat nearer the plate. These hooks constitute guides and lifters for the weft-threads from the reels, as will appear hereinafter.

H indicates the thread-holder, which is employed for the purpose of taking hold of the warp-threads and bringing them up to the brocheur-frame, so as to form a loop for the weft-threads from the reels to pass around in forming the first half-hitch in the knot, said thread-holder having several other functions, presently described. This thread-bearer is composed of an outer slidable section, $H^2$, formed with a series of transverse slots, $n$, for receiving the threads, and an inner slidable section, $h^2$, carrying pins $h^3$, which, when projected across the slots of the outer section of the thread-bearer, engage and hold the warp-threads within said slots. These pins are arranged in pairs, two for each slot, and are located upon the inner slidable section, so that said section can be moved to bring the pins across the slots or be moved so as to leave the slots perfectly open to drop or receive the threads. The section of the thread-carrier carrying these pins can be shifted in one direction, so as to throw the pins across the slots by the action against one of its ends of an arm, $C^6$, upon the thread-lifter $C^2$, (shown in Fig. 7.) The devices for shifting this inner slidable section in the reverse direction at the proper moment for releasing the loop consist of a cam-faced wheel, $C^7$, Figs. 2 and 10, upon the shaft F' and a pivoted arm, $C^8$, supported upon one of the segmental rack-bars $F^2$. At the proper moment the cam actuates this pivoted arm, so as to cause its upper end to act on the inner section of the thread-holder, so as to throw the section $h^2$ in a direction carrying the pins out of the way of the slots in the bearer. A spring, $C^9$, is employed for restoring this pivoted arm to its normal position. The outer section, $H^2$, of the thread-holder slides along a slotted supporting-bar, $H^3$, that is supported at its ends in the swinging arms $K^2$, the said outer section of the thread-holder being provided at one end with a fixed pulley, $h^4$, that is clutched by a forked lever, $h^5$. This forked lever has a side movement just after the warp-threads have been caught and taken up by the thread-holder, so that it will shift the thread-holder along the bar supporting it in order to bring the lines of thread into position for forming the diagonal meshes, this movement on the part of the vibratory forked lever occurring each time that the warp-threads have been taken up by the thread-holder, so that in forming the diagonal mesh the warp-threads are carried first to right and knotted with the weft-threads, and then to the left and tied with the next adjacent weft-threads. The requisite vibrating side movements are imparted to the forked lever by a wheel, $h^6$, (see Fig. 10,) having upon its face a cam-groove, $h^7$, that receives a stud or anti-friction roller upon an arm, $H^4$, supporting the forked lever. This supporting-arm is hung at one end upon the shaft I, (see Fig. 1,) that carries the wheels for actuating the feed-bar roller, already described, and the forked lever $h^5$ passes up from its supporting-arm through a slot in a fixed plate, $h^8$.

The various swinging movements of the slotted bar carrying the thread-holder are effected by the wheels K, having cam-races $k$, which receive the anti-friction rollers $k'$, that are arranged upon the sides of the arms $K^2$, in which the ends of said bar are journaled. To the lower ends of the arms $K^2$ are connected the levers $K^3$, having at their outer ends the adjustable counter-weights $k^2$, which insure certainty of action on the part of the thread-holder mechanism. These weighted levers are also provided with studs or anti-friction rollers $k^3$, which are received in the cam-races $k^4$, said cam-races being formed in wheels $K^4$ upon the shaft F', which also carries the wheels F, provided with cam-races for actuating the brocheur-frame, as already described.

Upon the shaft L, that carries the wheel K for swinging the thread-holder, is fixed a cam, $L^2$, (see Fig. 5,) which at each revolution of the shaft engages a stud, $l$, upon a vertical slide-bar, $l'$. The bar that carries the thread-holder is provided with a finger, $l^2$, (see Fig. 6,) which strikes against and rests upon the upper end of the slide-bar $l'$ after the latter has been raised to its fullest extent. This gives a part turn to the bar carrying the thread-holder, and hence tilts the latter up into an angular position. The mechanism is timed to effect this movement at that juncture in tying the knot when it becomes necessary to spread open the loop that is held by the thread-holder, as will be seen farther on.

M M' indicate the mold-bars, which are employed for determining the size of mesh and for affording devices upon which the knots can be tied. These mold-bars consist of two parallel bars, with fingers $m$ alternating on opposite sides, as indicated, this arrangement being provided for admitting of the diagonal meshes being formed. The mold-bar M is supported upon the slide-bars N N, one of which is shown in Fig. 12, that are arranged to slide upon brackets O, and the mold-bar M' is mounted upon the T-shaped arms P, the long arms $p$ of which are pivoted to the slide-bars N. These arms or supports P are provided with anti-friction rollers Q, resting upon the cams R, by means of which the mold-bar M' is supported. The cams raise the mold-bar M' above the mold-bar M during the formation of one line of meshes, and then allow the same to drop below the mold-bar M during the formation of the next line of meshes, the meshes in each case being formed upon the fingers of the highest mold-bar.

The arms P for the mold-bar M' have inclines $m^2$, and the brackets O have like inclines, $m^3$, which inclines act in conjunction to give a forward or a backward movement to the mold-bars for the purpose of throwing the meshes off from their fingers—as, for example, when the mold-bar M' is raised by the cams the contact of the said inclines will throw both of the mold-bars slightly to one side of a line between the rollers that draw down the finished meshes. At the proper time, when the cams let the mold-bar M' drop it will also shift back, thus throwing off the meshes formed upon it. When it is next raised it will be thrown forward again, and by reason of its connection with the mold-bar M cause a like movement on the part of the latter, thereby throwing off the meshes formed upon the fingers of said mold-bar M.

Springs S are employed for retracting the mold-bars when the cams allow the mold-bar M' to drop. The fingers of the mold-bars can have their flat sides in a horizontal plane, or they can be turned so that the said flat sides will occupy vertical planes, thereby taking up but little space.

On shaft $e^5$ is a pinion, T, engaging a gear-wheel, $t$, loose upon one of the shafts $e^3$. Fixed to this wheel $t$ is a pinion, $t'$, which gears with a pinion, $t^2$, on a short shaft, $t^3$, carrying the cam $h^6$, employed for vibrating the forked lever that shifts the thread-holder.

Fixed on one of the short shafts $e^3$ is a pinion, $u$, gearing with a second pinion, $u'$, on a shaft, $u^2$, that carries the cam R, employed for raising the arm P, supporting the mold-bar M'.

V indicates the swinging thread-bearer for pressing the warp back of the thread-holder down to the mold-bar, so as to form the loops. This device is supported on arms V', having studs or rollers $v$ entering cam-races $V^2$ in the wheels $V^3$ upon the shaft I. This shaft is rotated by one of the gear-wheels $f$ at the power end of the machine gearing with a gear, $f'$, upon the shaft L, carrying at its opposite end a gear-wheel, $V^4$, meshing with a like gear-wheel, $V^5$, upon the shaft I.

The method of forming the meshes and tying the knots is illustrated as follows: The thread guide and lifter $C^2$ rises vertically and lifts the warp-threads W up to the thread-bearer H, the slots $h$ of which have been opened to receive the threads by the action of the pivoted arm $C^8$ striking against the inner sliding section, $h^2$, carrying the pins $h^3$, drawing the pins back from said slots. At the moment the threads have reached the inner ends of the slots the projection $C^6$ upon the thread guide and lifter $C^2$ strikes the beveled end of the said sliding section $h^2$ of the thread-bearer, and hence shifts the same so as to project the pins across the slots. The threads will then be held by the inner pins—that is to say, the pins of the sliding section $h^2$ nearest the inner ends of the slots. At the same time the brocheur-frame $D^2$ assumes the slanting position shown in Fig. 19, so that the brocheurs will be in the oblique position also shown in said figure. This position on the part of the brocheurs and their supporting-frame allows the weft-threads from the reels to rest upon the inner hooks of the fingers G, carried by the brocheur-frame, the threads being held taut by means of the tension device within the reel-carrier. The thread-bearer carrying the warp-threads then rises to some extent and swings over toward the brocheur-frame until it arrives at a position over the mold-bars, so that those portions of the warp-threads forming a loop between said bars and the thread-bearer will be in or about a vertical plane, as shown in Fig. 20. The thread-leader also swings forward over the thread-lifter $C^2$, which meanwhile has descended by the action of the cam-races, hereinbefore described. This thread-leader in swinging forward strikes against those portions of the warp-threads that are between the thread-bearer and the feed-bar roller B, and brings these portions, which may be designated as the "second" part of the warp-threads, alongside of those portions between the thread-bearer and the mold-bars, which may be designated as the "first" part of the warp, the leader continuing its movement until it brings said second part of the warp-threads nearer the pointed bars or fingers of the mold-bar, thereby forming a loop in each of the warp-threads. Meanwhile the brocheur-frame moves forward toward the thread-bearer, and also makes a partial rotation about its axis, so as to bring its fingers into a horizontal position below the thread-holder and between the several loops held by the thread-holder. The reels are now upon the under side of the brocheur-frame and in a vertical position, and the weft-threads, having been caught upon the outer hook of the finger during the rotation of the brocheur-frame, will, in conjunction with the loop formed by the two parts of the weft-thread, form a triangle, as illustrated in Fig. 20. The thread-leader now holding the second part of the warp-thread near the mold-bar, one of the star-wheels will be turned so as to act upon the rack-bars on the brocheur-frame and actuate the pinions thereon in the manner before set forth. This causes a half-revolution of the brocheurs, the free ends passing through the triangle of threads and around the loop formed by the two parts of the warp-thread, which fall into or are caught by the notch $d^2$ in the base-plate of the brocheur as the brocheur is swung from one center to the other, so as to cause the weft-thread to take a half-hitch around the loops, as shown in Figs. 21 and $21^a$. In completing its half-revolution the free end of each brocheur will be caught upon the second head of the pair upon which it alternately turns, and as soon as it is thus engaged the other end of the brocheur will be disengaged from the head upon which it has made a quarter of a revolution, and it will then make the next quarter of a revolution upon the second head. The thread-bearer and the brocheur-frame then separate, the latter also making a partial turn backward about its axis, whereby the half-hitch formed by the weft-thread around the loop of the warp-thread will be drawn down toward the first part of the knot which is illustrated in Figs. 21 and $21^a$. The thread-leader V then swings back to its first position near the feed-bar roller, and the brocheur-frame and thread-holder approach each other, so as to assume the position taken in forming the first part of the knot, the thread-holder swinging as before and the brocheur-frame moving toward the thread-holder and making a partial rotation about its axis, so as to bring the reels underneath and in a vertical position, as shown in Fig. 22. The thread-holder, in moving toward the brocheur-frame, makes a partial rotation about its axis, so that it will slant when it arrives in position over the fingers of the brocheur-frame. This movement on the part of the thread-holder is caused by its finger $l^2$ striking against the upper end of the vertical slide-bar $l'$, which has meanwhile been raised for such purpose by the cam $L^2$ acting upon the pin $l$ on said bar $l'$, already described. The slant of the thread-bearer opens the loop in the warp-thread, as shown in Fig. 22, such action being effected by means of a pair of the pins that close the slot in the thread-bearer, it being seen that the second part of the warp-thread will be thrown away from the first part by the pin nearest the outer end of the slot. The brocheur is then caused to return or make a half-turn in the same manner, but in a reverse direction, to that which it has made in forming the first part of the knot, the second star-wheel coming into play in this instance for the purpose of actuating the rack-bars that cause a simultaneous movement of the pinions carried by the brocheur-frame. In this movement of the brocheur the reel, with the weft-thread, is carried through the loop formed of warp-thread, and this forms the second part of the knot, as shown in Figs. 23 and 23$^a$, which, when tightened up, will not slip under any circumstance. The brocheur-frame then moves back, and, making a partial revolution about its axis, returns to its first position—that is to say, the one which it occupied preparatory to tying the first part of the knot, as shown in Fig. 19. The thread-holder swings away from the brocheur-frame and drops the warp-threads, the arm $C^8$ striking one end of the inner section of the thread-holder to effect such release of the threads. The feed-roller bar also moves back, thereby drawing the warp-threads and tightening up the knot. The knots being tied upon the fingers of the mold-bar and the mesh formed around said fingers, the highest mold-bar upon which the meshes have been formed drops, and is also shifted back a sufficient distance to cause its fingers to slip out from the meshes formed and allow the same to be taken between the rollers, as shown in Fig. 24. As this mold thus moves back the second mold-bar is drawn with it by reason of the connection between the two and the spring before referred to. The said second mold-bar having thus shifted back and dropped, the other mold-bar, which is now the highest, will take the place of the mold-bar just employed, and the next row of meshes will therefore be formed upon said highest mold-bar. The fingers of the two sets, being diagonally opposite each other, admit of the meshes being formed in diagonal lines, and as soon as a line of knots have been tied, a line of meshes formed, in the manner already described, and the warp-threads taken up by the thread-holder the said thread-holder will be shifted to one side by reason of the forked lever engaging it, so that the warp-threads will be moved laterally, so that when engaged again by the weft-threads the diagonal mesh will be formed. After the next series of meshes have been formed, and the thread-holder, which it will be remembered released the warp-threads during the operation of tying the knots, has again taken up the warp-threads, the thread-holder will be shifted in a direction reversely to that just described.

What I claim is—

1. The combination, with the devices for forming the warp-threads into loops, of the brocheurs carrying the weft-threads, mechanism for causing said brocheurs first to form a half-hitch of the weft-threads around said loops, and then for passing the weft-threads through the loops to complete the knot, devices for tightening the knots, and devices for shifting the thread-holder so as to move the warp-threads laterally in order to form the diagonal mesh, substantially as described.

2. The brocheur-frame, the brocheur carrying a reel, and mechanism for causing said brocheur to turn upon two centers upon the brocheur-frame to engage the weft-thread with the warp-thread in the manner described, in combination with devices for manipulating and looping the warp-threads, whereby the brocheur in turning upon one center will pass the weft-thread around a loop in the warp-thread so as to form a half-hitch therearound, and in turning around the remaining center will pass the weft-thread through the loop formed in the warp-thread to form the second hitch and complete the knot, substantially as described.

3. The combination of the oscillatory brocheur-frame, carrying a series of pinions having heads upon their spindles, and a rack-bar for actuating the said pinions with the brocheur carrying a reel and adapted to engage and turn with the heads of the pinion-spindles, substantially in the manner and for the purpose described.

4. The combination of the oscillatory brocheur-frame provided with the fingers having hooks, the brocheurs supported by said frame and carrying reels for the weft-threads, the swinging thread-holder for the warp-threads, adjusted to be brought into position above the fingers of the brocheur-frame, the thread-leader adapted to bring the warp-thread down to form a loop, and mechanism for imparting the movements specified to the thread-holder and thread-leader, substantially as and for the purpose described.

5. The oscillatory brocheur-frame provided with a series of fingers having hooks, the rotary pinions $d^6$, having heads $D^3$ upon their spindles, and the brocheurs D, each carrying a reel and formed with two grooves capable of receiving the heads of the pinion-spindles, combined with mechanism for imparting the necessary oscillatory movement to the pinions $d^6$, substantially as described.

6. The combination of the mold-bars M M' with the swinging thread-leader V, the thread-holder H, constructed and adjusted to engage the warp-thread and to coact with the thread-leader in forming the warp-thread into a loop above the mold-bars, the oscillatory brocheur-frame $d$, the brocheur D, carrying a reel for the weft-thread and movable on two centers, and a part revolution upon a second center, in the manner described, so as to carry the warp-thread through said loop, and mechanism for imparting the necessary movements to said devices, substantially as described.

7. The combination of the oscillatory brocheur-frame, the brocheurs D, carrying reels for the weft-threads, the pinions having heads upon their axles for turning the brocheurs, the slidable rack-bar located to engage said pinions, and the star-wheels adjusted to act at different periods upon the rack-bar in order to reciprocate the same, and mechanism for imparting the necessary movements to the slidable rack-bars and star-wheels, substantially as described.

8. The combination, with the oscillatory brocheur-frame $d$, of the brocheurs D, carrying reels for the warp-threads, the pinions $d^6$, carrying the brocheurs upon their spindles, the slidable rack-bar engaging said pinions, the segmental racks engaging said wheels upon the brocheur-frame, the star-wheels, mechanism for intermittently actuating the star-wheels, and mechanism for operating the brocheur-frame, whereby the segmental racks oscillate the brocheur-frame, substantially as described.

9. The combination, with the swinging bar $H^3$, carrying the thread-holder H, of the thread-holder H, provided with devices for engaging the warp-threads, and mechanism timed for sliding the thread-holder upon its supporting-bar, substantially as described, and for the purpose set forth.

10. The combination, with the supporting-bar $H^3$, carrying the thread-holder H, of the vertically-movable bar $l'$ and devices timed to raise said vertically-movable bar in position to tilt the thread-holder so as to spread the loop, substantially as described.

JEAN CHAUNIER. [L. S.]

Witnesses:
BENJ. F. PEIXOTTO,
H. FESCHOTTE.